US007012886B2

(12) United States Patent
Meier et al.

(10) Patent No.: US 7,012,886 B2
(45) Date of Patent: Mar. 14, 2006

(54) WALSH CODE ALLOCATION/DE-ALLOCATION SYSTEM

(75) Inventors: Steven K. Meier, Batavia, IL (US); Christopher D. Palm, Naperville, IL (US); Steven M. Welsh, Aurora, IL (US); John K. Burgess, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 931 days.

(21) Appl. No.: 09/858,382

(22) Filed: May 16, 2001

(65) Prior Publication Data

US 2002/0172168 A1 Nov. 21, 2002

(51) Int. Cl.
*H04J 11/00* (2006.01)
*H04J 13/00* (2006.01)
*H04B 7/216* (2006.01)
*H04Q 7/00* (2006.01)

(52) U.S. Cl. ...................... 370/209; 370/335; 370/342; 370/441; 370/477; 455/450

(58) Field of Classification Search ................ 375/146; 455/450, 452.1; 370/479, 477, 441, 342, 370/335, 329, 209, 208
See application file for complete search history.

(56) References Cited

U.S. PATENT DOCUMENTS 5,751,761 A * 5/1998 Gilhousen ................... 375/146
6,041,034 A 3/2000 Fukumasa et al.
6,084,884 A * 7/2000 Adachi ....................... 370/441
6,088,347 A * 7/2000 Minn et al. ................. 370/342
6,108,369 A * 8/2000 Ovesjo et al. .............. 375/146
6,163,524 A 12/2000 Magnusson et al.
6,233,231 B1 * 5/2001 Felix et al. ................. 370/335
6,477,158 B1 * 11/2002 Take .......................... 370/335
6,700,881 B1 * 3/2004 Kong et al. ................. 370/335

(Continued)

FOREIGN PATENT DOCUMENTS

EP 0 944 198 A2 9/1999

OTHER PUBLICATIONS

Minn et al, Dynamic Assignement of Orthogonal Variable -Spreading-Factor Codes in W-CDMA, IEEE, Aug. 2000, pp. 1429-1440.*

(Continued)

*Primary Examiner*—Hassan Kizou
*Assistant Examiner*—Ahmed Elallam

(57) ABSTRACT

A method of allocating CDMA codes from a set of the same is provided for use in connection with a wireless network. The method includes, after identifying a desired size of the code to be allocated, determining if there exists a code of the desired size whose sibling is unavailable. If such a code is found, then it is allocated. Otherwise, it is determined if there exists a code of smaller than the desired size whose sibling is unavailable. When such a code (i.e., a code of smaller than the desired size whose sibling is unavailable) is found, a descendant thereof which has the desired size is allocated.

20 Claims, 7 Drawing Sheets

U.S. PATENT DOCUMENTS

| | | | | |
|---|---|---|---|---|
| 6,704,328 | B1 * | 3/2004 | Khaleghi et al. | 370/468 |
| 6,714,526 | B1 * | 3/2004 | Wei et al. | 370/335 |
| 6,724,813 | B1 * | 4/2004 | Jamal et al. | 375/219 |
| 6,822,998 | B1 * | 11/2004 | Yun et al. | 375/130 |
| 6,831,910 | B1 * | 12/2004 | Moon et al. | 370/342 |
| 6,876,690 | B1 * | 4/2005 | Imbeni et al. | 375/130 |
| 6,907,060 | B1 * | 6/2005 | Yang | 375/141 |
| 2001/0008523 | A1 * | 7/2001 | Song | 370/335 |
| 2002/0067692 | A1 * | 6/2002 | Yun et al. | 370/209 |
| 2002/0172264 | A1 * | 11/2002 | Wilberg et al. | 375/147 |
| 2003/0076795 | A1 * | 4/2003 | Bender et al. | 370/332 |

OTHER PUBLICATIONS

Adachi et al, Orthogonal Multi-Spreading Factor Forward Link for Coherent DS-CDMA Mobile Radio, IEEE, 1997, pp. 618-622.*

* cited by examiner

*FIG. 2A*

| $W_k^N$ | N=4 | N=8 | N=16 | N=32 | N=64 | N=128 |
|---|---|---|---|---|---|---|
| k | 0 | 0 | 0 | 0 | 0 | 0 |
| | | | | | | 64 |
| | | | | | 32 | 32 |
| | | | | | | 96 |
| | | | | 16 | 16 | 16 |
| | | | | | | 80 |
| | | | | | 48 | 48 |
| | | | | | | 112 |
| | | | 8 | 8 | 8 | 8 |
| | | | | | | 72 |
| | | | | | 40 | 40 |
| | | | | | | 104 |
| | | | | 24 | 24 | 24 |
| | | | | | | 88 |
| | | | | | 56 | 56 |
| | | | | | | 120 |
| | | 4 | 4 | 4 | 4 | 4 |
| | | | | | | 68 |
| | | | | | 36 | 36 |
| | | | | | | 100 |
| | | | | 20 | 20 | 20 |
| | | | | | | 84 |
| | | | | | 52 | 52 |
| | | | | | | 116 |
| | | | 12 | 12 | 12 | 12 |
| | | | | | | 76 |
| | | | | | 44 | 44 |
| | | | | | | 108 |
| | | | | 28 | 28 | 28 |
| | | | | | | 92 |
| | | | | | 60 | 60 |
| | | | | | | 124 |

*FIG. 2B*

<table>
<tr><th>$W_k^N$</th><th>N=4</th><th>N=8</th><th>N=16</th><th>N=32</th><th>N=64</th><th>N=128</th></tr>
<tr><td rowspan="32">k</td><td rowspan="32">1</td><td rowspan="16">1</td><td rowspan="8">1</td><td rowspan="4">1</td><td rowspan="2">1</td><td>1</td></tr>
<tr><td>65</td></tr>
<tr><td rowspan="2">33</td><td>33</td></tr>
<tr><td>97</td></tr>
<tr><td rowspan="4">17</td><td rowspan="2">17</td><td>17</td></tr>
<tr><td>81</td></tr>
<tr><td rowspan="2">49</td><td>49</td></tr>
<tr><td>113</td></tr>
<tr><td rowspan="8">9</td><td rowspan="4">9</td><td rowspan="2">9</td><td>9</td></tr>
<tr><td>73</td></tr>
<tr><td rowspan="2">41</td><td>41</td></tr>
<tr><td>105</td></tr>
<tr><td rowspan="4">25</td><td rowspan="2">25</td><td>25</td></tr>
<tr><td>89</td></tr>
<tr><td rowspan="2">57</td><td>57</td></tr>
<tr><td>121</td></tr>
<tr><td rowspan="16">5</td><td rowspan="8">5</td><td rowspan="4">5</td><td rowspan="2">5</td><td>5</td></tr>
<tr><td>69</td></tr>
<tr><td rowspan="2">37</td><td>37</td></tr>
<tr><td>101</td></tr>
<tr><td rowspan="4">21</td><td rowspan="2">21</td><td>21</td></tr>
<tr><td>85</td></tr>
<tr><td rowspan="2">53</td><td>53</td></tr>
<tr><td>117</td></tr>
<tr><td rowspan="8">13</td><td rowspan="4">13</td><td rowspan="2">13</td><td>13</td></tr>
<tr><td>77</td></tr>
<tr><td rowspan="2">45</td><td>45</td></tr>
<tr><td>109</td></tr>
<tr><td rowspan="4">29</td><td rowspan="2">29</td><td>29</td></tr>
<tr><td>93</td></tr>
<tr><td rowspan="2">61</td><td>61</td></tr>
<tr><td>125</td></tr>
</table>

*FIG. 2C*

| $W_k^N$ | N=4 | N=8 | N=16 | N=32 | N=64 | N=128 |
|---|---|---|---|---|---|---|
| k | 2 | 2 | 2 | 2 | 2 | 2 |
| | | | | | | 66 |
| | | | | | 34 | 34 |
| | | | | | | 98 |
| | | | | 18 | 18 | 18 |
| | | | | | | 82 |
| | | | | | 50 | 50 |
| | | | | | | 114 |
| | | | 10 | 10 | 10 | 10 |
| | | | | | | 74 |
| | | | | | 42 | 42 |
| | | | | | | 106 |
| | | | | 26 | 26 | 26 |
| | | | | | | 90 |
| | | | | | 58 | 58 |
| | | | | | | 122 |
| | | 6 | 6 | 6 | 6 | 6 |
| | | | | | | 70 |
| | | | | | 38 | 38 |
| | | | | | | 102 |
| | | | | 22 | 22 | 22 |
| | | | | | | 86 |
| | | | | | 54 | 54 |
| | | | | | | 118 |
| | | | 14 | 14 | 14 | 14 |
| | | | | | | 78 |
| | | | | | 46 | 46 |
| | | | | | | 110 |
| | | | | 30 | 30 | 30 |
| | | | | | | 94 |
| | | | | | 62 | 62 |
| | | | | | | 126 |

*FIG. 2D*

| $W_k^N$ | N=4 | N=8 | N=16 | N=32 | N=64 | N=128 |
|---|---|---|---|---|---|---|
| k | 3 | 3 | 3 | 3 | 3 | 3 |
| | | | | | | 67 |
| | | | | | 35 | 35 |
| | | | | | | 99 |
| | | | | 19 | 19 | 19 |
| | | | | | | 83 |
| | | | | | 51 | 51 |
| | | | | | | 115 |
| | | | 11 | 11 | 11 | 11 |
| | | | | | | 75 |
| | | | | | 43 | 43 |
| | | | | | | 107 |
| | | | | 27 | 27 | 27 |
| | | | | | | 91 |
| | | | | | 59 | 59 |
| | | | | | | 123 |
| | | 7 | 7 | 7 | 7 | 7 |
| | | | | | | 71 |
| | | | | | 39 | 39 |
| | | | | | | 103 |
| | | | | 23 | 23 | 23 |
| | | | | | | 87 |
| | | | | | 55 | 55 |
| | | | | | | 119 |
| | | | 15 | 15 | 15 | 15 |
| | | | | | | 79 |
| | | | | | 47 | 47 |
| | | | | | | 111 |
| | | | | 31 | 31 | 31 |
| | | | | | | 95 |
| | | | | | 63 | 63 |
| | | | | | | 127 |

200

WALSH CODE ALLOCATION/DE-ALLOCATION SYSTEM

BACKGROUND OF THE INVENTION

The present invention relates to the art of wireless telecommunication networks. It finds particular application in conjunction with third generation (3G) wireless systems using code division multiple access (CDMA) technology, and will be described with particular reference thereto. However, it is to be appreciated that the present invention is also amenable to other like applications.

Walsh codes, spreading codes, channelization codes and the like are generally known in the art of wireless telecommunication networks. In particular, Walsh codes and/or Walsh functions are based on the Walsh-Hadamard matrices. However, for simplicity herein, the terms Walsh code and/or Walsh function are used to refer generally to any similarly employed spreading codes/functions, channelization codes/functions, etc. In CDMA, Walsh functions are used in a forward direction to organize network traffic over an air interface into different channels that can be isolated and decoded by target mobiles, e.g., wireless telephones, wireless personal digital assistants (PDAs) or other wireless devices. The forward or downlink direction refers to a transmitting direction from a base station to a mobile station.

At any given time for the same sector/carrier within a given cell site of a wireless telecommunications network, all the Walsh codes in use have to be mutually orthogonal with each other in order to properly organize the network traffic without interference or cross-talk between the different channels. This restriction was not particularly problematic for second generation wireless systems using CDMA. Second generation wireless generally encompasses the so called digital personal communications service (PCS). In any event, $2^{nd}$ generation systems using CDMA only employ Walsh codes of a single size or bit length and all the codes used are guaranteed to be orthogonal to one another. For example, 64 Walsh codes each 64 bits in length are used in the typical implementation of $2^{nd}$ generation systems.

As opposed to the $2^{nd}$ generation, 3G wireless systems employing CDMA use Walsh codes of varying sizes or bit lengths. For example, traffic such as voice calls typically continue to use 64-bit Walsh codes. However, in 3G, some voice calls or traffic may use 128-bit Walsh codes. Similarly, for high-speed data traffic (e.g., wireless Internet access), 3G wireless makes available a variety of Walsh codes with shorter lengths, e.g., 32, 16, 8 and 4 bit lengths. Accordingly, unlike the $2^{nd}$ generation which uses uniformly sized Walsh codes, Walsh code allocation in 3G CDMA wireless is not trivial. Walsh code allocation refers to the selection and/or assignment of Walsh codes for the different channels of cell traffic. Generally, it is preferable to employ shorter bit length Walsh codes for higher speed traffic.

In 3G CDMA wireless, variable size Walsh codes are made available for use. Consequently, all the available Walsh codes for the same sector/carrier within a given cell site are not guaranteed to be mutually orthogonal and their allocation fails to be a trivial matter. More specifically, each Walsh function in the set of Walsh functions having a bit length or size of N is non-orthogonal to: two Walsh functions in the set of Walsh functions of size 2N; four Walsh functions in the set of Walsh functions of size 4N; eight Walsh functions in the set of Walsh functions of size 8N; and so on. In particular, $W_k^N$ is non-orthogonal to:

$W_k^{2n}$ and $W_{(k+N)}^{2n}$;

$W_k^{4N}$, $W_{(k+N)}^{4N}$, $W_{(k+2N)})^{4N}$ and $W_{(k+3N)}^{4N}$;

$W_k^{8N}$, $W_{(k+N)}^{8N}$, $W_{(k+2N)}^{8N}$, $W_{(k+3N)}^{8N}$, $W_{(k+4N}^{8N}$, $W_{(k+5N)}^{8N}$, $W_{(k+6N}^{8N}$ and $W_{(k+7N)}^{8N}$;

. . .

$W_{(k)}^{(2\hat{}n)N}$, $W_{(k+N)}^{2\hat{}n)N}$, $W_{(k+2N)}^{(2\hat{}n)N}$, $W_{(k+3N)}^{(2\hat{}n)N}$, $W_{(k+4N)}^{2\hat{}n)N}$ . . . and $W_{(k+((2\hat{}n)-1)N)}^{(2\hat{}n)N}$.

Regarding notation, $W_N$ represents the set of Walsh functions/codes having a size or bit length of N, and $W_k^N$ represents the $k^{th}$ element of $W^N$ (note: the number or value of k used to reference a particular element does not necessarily equate to the binary representation of the corresponding Walsh code).

Accordingly, the problem presented with the advent of 3G CDMA wireless involves the manner in which to allocate Walsh codes while ensuring the mutual orthogonality of all the concurrently used codes for the same sector/carrier within a given cell site. It is desirable, moreover, to carry out the allocation in such a manner that the number of Walsh codes remaining available for allocation at any given time is maximized. In this manner, efficient use of the cell's finite bandwidth and/or finite number of Walsh codes can be achieved. It is also desirable to maintain as great of a variety of Walsh code sizes available at any given time so that the greatest range of access speeds can be optimally accommodated (i.e., appropriately sized Walsh codes can be allocated) at any given time. Typically, this means reserving shorter bit length Walsh codes whenever possible.

Even though all the concurrently allocated Walsh codes may be mutually orthogonal, it is possible for the allocated Walsh codes to be selected such that the signal that is sent to the base station's amplifier exceeds an acceptable peak-to-average power ratio. The risk is that without a suitable allocation system the amplifier will be caused to operate in a non-linear manner and undesirable interference will be experienced in one or more frequency spectrums where it should not be. Accordingly, it is also desirable that the Walsh code allocation be implemented to avoid or minimize this risk, i.e., to maintain the peak-to-average power ratio at or below acceptable levels.

The present invention contemplates a new and improved Walsh code allocation/de-allocation system and method which overcomes or minimizes the above-referenced problems and others.

SUMMARY OF THE INVENTION

In accordance with one aspect of the present invention, a method of allocating CDMA codes from a set of the same is provided for use in connection with a wireless network. The method includes, after identifying a desired size of the code to be allocated, determining if there exists a code of the desired size whose sibling is unavailable. If such a code is found, then it is simply allocated. Otherwise, it is determined if there exists a code of smaller than the desired size whose sibling is unavailable. When such a code (i.e., a code of smaller than the desired size whose sibling is unavailable) is found, a descendant thereof which has the desired size is allocated.

In accordance with another aspect of the present invention, a Walsh code allocator is provided for use in connection with a wireless telecommunications network. The allocator receives a request for a Walsh code, and chooses, based on the request received, a Walsh code family from which the allocator selects a Walsh code. The Walsh code family chooses from a plurality of different Walsh code families which each include a plurality of Walsh codes of at least two different sizes. From the chosen family, a Walsh code suited to the request received is selected. The Walsh code is selected such that it is mutually orthogonal to Walsh codes which are currently busy, and such that an allocation thereof results in blocking a minimum number of Walsh codes not already blocked. Either the selected Walsh code is output by the allocator, or the allocator outputs an indication that a Walsh code suited to the request received is not available for allocation.

In accordance with yet another aspect of the present invention, a method is provided for allocating a set of codes used to distinguish and isolate air interface channels of a wireless telecommunications network. The method includes dividing the codes into a plurality of families such that each family includes a plurality of codes. Each of said codes has a size and at least two codes in each family have different sizes. The method further includes receiving a request for a code which identifies a desired size of code, and choosing a family from which a code is to be selected for allocation. A fragmented code is identified in the chosen family provided one exists, and a code in the chosen family is selected based on the identified fragmented code provided a fragmented code was identified, otherwise, no selection is made. The selected code is the one allocated provided a selection was made, otherwise it is indicated that no code is available.

One advantage of the present invention resides in the ability to ensure that only orthogonal Walsh codes are concurrently allocated. Another advantage of the present invention resides in the ability to achieve efficient use of a cell's finite bandwidth and finite number of Walsh codes.

In selected embodiments, yet another advantage of the present invention resides in the ability to maintain the greatest possible variety of available Walsh code sizes for optimal allocation of the greatest range of access speeds. One other advantage achieved by selected embodiments of the present invention resides in the ability to avoid or minimize the risk of exceeding the base station amplifier's acceptable peak-to-average power ratio.

Still further advantages and benefits of the present invention will become apparent to those of ordinary skill in the art upon reading and understanding the following detailed description of the preferred embodiments.

BRIEF DESCRIPTION OF THE DRAWING(s)

The invention may take form in various components and arrangements of components, and in various steps and arrangements of steps. The drawings are only for purposes of illustrating preferred embodiments and are not to be construed as limiting the invention.

FIGS. 2A through 2D are tables of Walsh codes used by the Walsh code allocator in accordance with aspects of the present invention.

DETAILED DESCRIPTION OF THE PREFERRED EMBODIMENT(s)

Figure 1:
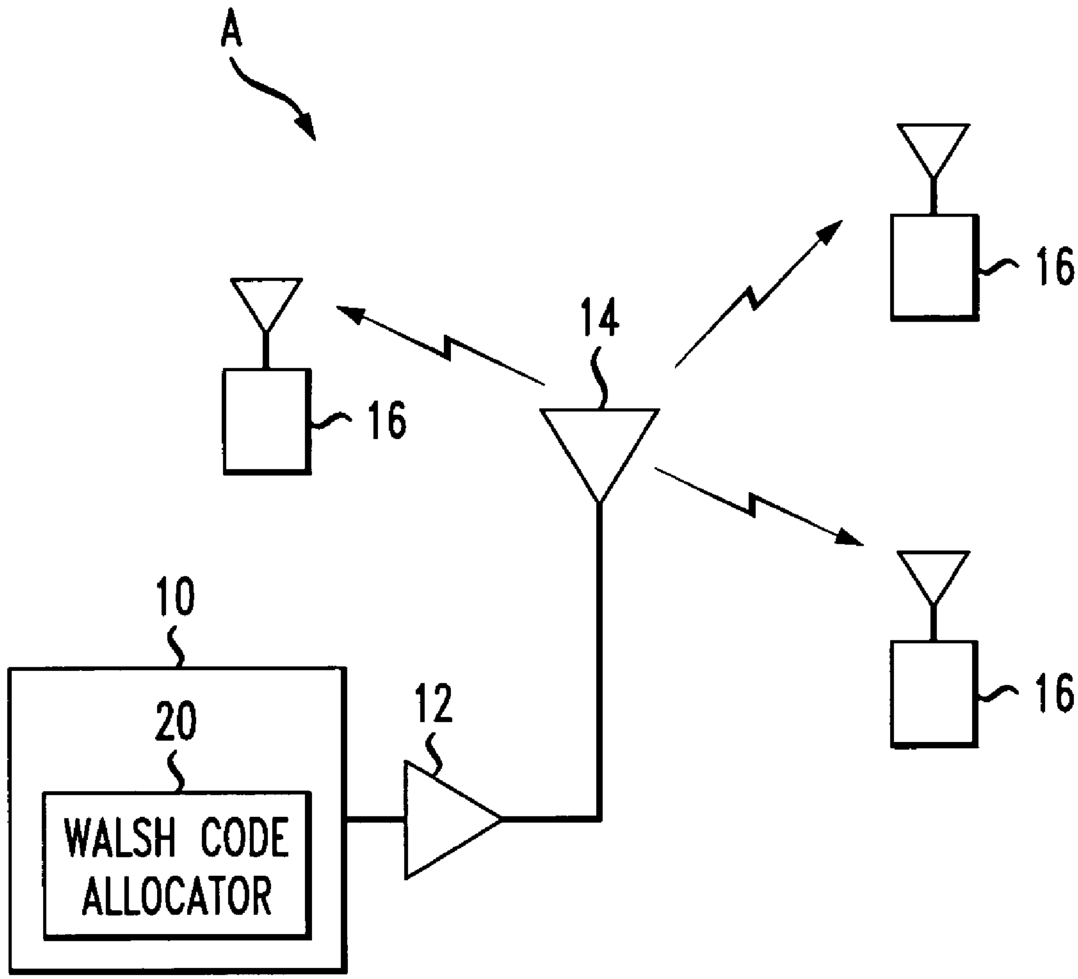
FIG. 1 is a diagrammatic illustration showing a telecommunications network incorporating a Walsh code allocator in accordance with aspects of the present invention.

FIG. 1 shows at least a portion of a wireless telecommunications network A including a cell base station 10 with a signal amplifier 12 and a transmit/receive antenna 14 and a plurality of mobile targets or stations 16 (e.g., wireless phones, wireless PDAs, etc.). With the exception of the novel Walsh code allocation/de-allocation system and method of the present invention, the network A is well known and its operation and configuration is readily understood by those skilled in the art. Again, with the exception of the novel Walsh code allocation/de-allocation system and method of the present invention, the network A preferably implements 3G wireless CDMA technology in the usual manner.

In accordance with a preferred embodiment of the present invention, the base station 10 includes a Walsh code allocator 20 which assigns or designates selected Walsh codes/functions to the network traffic relayed over the air interface between the base station 10 and the mobile stations 16 such that at any given time each channel thereon is associated with a corresponding unique and mutually orthogonal Walsh code/function. In this manner, a plurality of different channels existing concurrently between the base station 10 and mobile stations 16 can be isolated and distinguished. The Walsh code allocator 20 is optionally implemented via a hardware configuration, a software configuration or a combination of both. For example, the Walsh code allocator 20 is optionally embodied in a dedicated microprocessor (application specific or otherwise), a software object implemented via or running on the base station's existing hardware or processors, or some combination thereof. In one preferred embodiment, the allocator 20 also de-allocates codes.

With reference to FIGS. 2A–D, in accordance with aspects of the present invention, an exemplary table or matrix including all the Walsh codes used by the Walsh code allocator 20 is shown. Optionally, the table is a look up table (LUT) accessed by the allocator 20. Six Walsh code sizes are used, namely, $W^4$, $W^8$, $W^{16}$, $W^{32}$, $W^{64}$ and $W^{128}$. The various sizes correspond to the table columns. Within each size there are a number of orthogonal Walsh codes, the number being equal to the size. That is, $W^4$ includes 4 Walsh codes which are mutually orthogonal to one another and each has a bit length of 4, they are individually referenced by k=0, 1, 2 and 3; $W^8$ includes 8 Walsh codes which are mutually orthogonal to one another and each has a bit length of 8, they are individually referenced by k=0, 1, 2, 4, 5, 6 and 7; and so on for each size.

The table is arranged into four binary trees extending from left to right. Each tree is a Walsh Code Family (WCF) designated by its root node, i.e., the $W_0^4$ family, $W_1^4$ family, $W_2^4$ family and $W_3^4$ family. In each family, the respective relationships between Walsh codes are describe with reference to parents, children and siblings. Each parent Walsh code has two children Walsh codes which are siblings to one another. The two children of any parent are the two Walsh codes immediately adjacent and to the right of the parent. The Walsh codes are arranged in the table such that the descendants or progeny (i.e., the children, grandchildren, great-grandchildren, etc.) of any parent Walsh code are not orthogonal to that parent. Likewise, the parental ancestors (i.e., the parent, grandparent, great-grandparent, etc.) of any child are not orthogonal to that child. Siblings, however, are orthogonal. In other words, siblings are any pair of mutually orthogonal Walsh codes of the same size which are both non-orthogonal children to the same parent Walsh code of half their size.

For purposes of the description herein, the following terms are being defined. A fragmented Walsh code is any Walsh code which is the sibling of any blocked or busy Walsh code. Additionally, while not otherwise considered fragmented, at least one Walsh code of the smallest size in each family is deemed fragmented. A busy Walsh code is any Walsh code that has been allocated by the allocator 20 and is still presently allocated or assigned to a channel. A blocked Walsh code is any Walsh code, the allocation of which would result in two or more busy Walsh codes being non-orthogonal. Accordingly, in a preferred embodiment of the present invention, the progeny and parental ancestors of any busy Walsh code are blocked. A blocked Walsh code is prohibited or "blocked" from being allocated to a channel by the allocator 20. A Walsh code which is either blocked or busy is termed unavailable.

Figure 3:
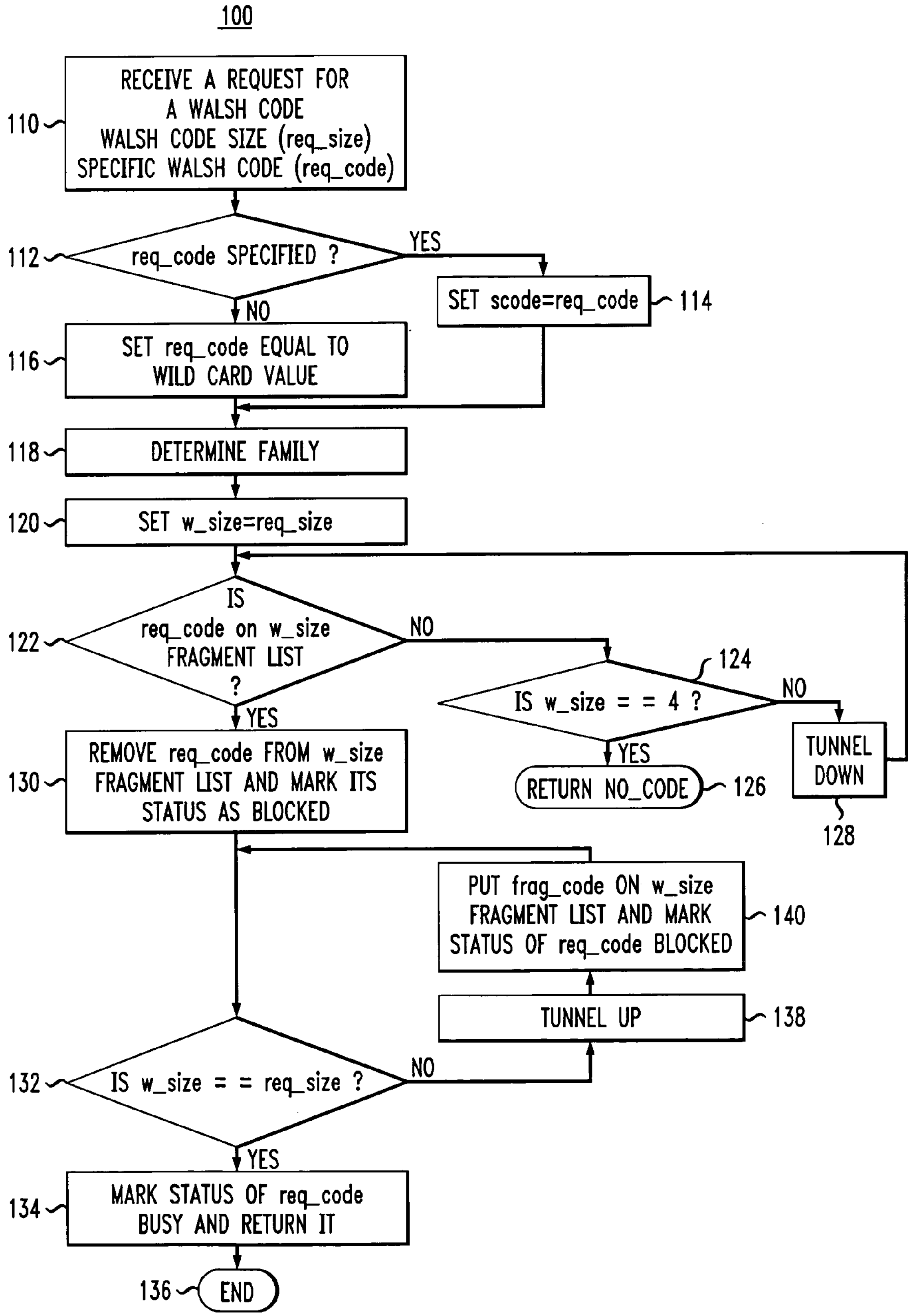
FIG. 3 is a flow chart showing an allocation process carried out by the Walsh code allocator in accordance with aspects of the present invention.

In accordance with a preferred embodiment of the present invention, the flow chart of FIG. 3 illustrates the allocation process 100 carried out by the Walsh code allocator 20, i.e., the method by which Walsh codes are allocated and/or assigned to channels of cell traffic. The process 100 begins at step 110 with the allocator 20 receiving a request for a Walsh code. For example, the request is generated in conjunction with the establishment of a new channel and/or is precipitated by the opening of a channel, be it an overhead channel, a fundamental channel of voice or data traffic, or otherwise. The received request includes an indication of the Walsh code size desired. Optionally, a particular Walsh code is specified, e.g., for a particular overhead channel. In the flow chart, the requested size is denoted by the value "req_size" and the requested code is denoted by the variable "req_code". Both are initially set in accordance with the received request. Through out the process 100 the req_size value remains unchanged while req_code may vary.

At decision step 112, it is determined if a particular code was specified. If the determination of step 112 is positive or yes, the value of "scode" is set equal to the current (i.e., initial) value of req_code at step 114. The unchanging scode preserves the value of the initial requested code when a particular code is specified. If the determination of step 112 is negative or no, req_code is set equal to a wild card value at step 116.

At step 118, the WCF is determined and/or selected. Determining the WCF is relatively straight forward when a particular code has been specified, it is scode%4, where "%" represent the modulus operator which returns the remainder of the first argument divided by the second argument, i.e., scode%4 equals the remainder of scode divided by 4. In this manner, the WCF containing the particular code specified is identified and/or selected. On the other hand, there are a number of options for WCF selection when no particular code is specified in the request. In one preferred embodiment, a particular WCF (e.g., the $W_3^4$ family) may be set aside or designated for high speed data traffic. Accordingly, if it is determined that the channel or request is for high speed data, that particular WCF is optionally selected automatically. Otherwise, the WCF with the lowest "count" is selected. The count is measured by and/or equal to the number of Walsh codes of the largest size (i.e., $W^{128}$) which are either busy or blocked. By selecting the WCF with the lowest count, Walsh code allocation is balanced across the families and the risk of exceeding the maximum acceptable peak-to-average power ratio of the amplifier 12 is minimized.

In any event, once the WCF is determined and/or selected, the rest of the process 100 for that request is carried out within that family.

At step 120, the variable "w_size" is set equal to req_size. As will be appreciated from the description herein, the variable w_size is used so that, among other things, the process 100 may, in various steps thereof, tunnel back and forth or step through the different Walsh code sizes while maintaining the integrity or value of the originally requested Walsh code size.

In accordance with a preferred embodiment of the present invention, the allocator 20 maintains and/or has access to lists of fragmented Walsh codes which are organized, e.g., in a record, database or otherwise. Preferably, for each WCF, respectively, one such list, nominally termed herein a fragment list, is maintained for each Walsh code size. The fragment list identifies and/or includes the fragmented Walsh codes existing in its corresponding WCF and size. For simplicity, however, as the process 100 is, at this point, restricted to the selected WCF, the fragment lists are only going to be referred to by their corresponding sizes. The respective fragment lists are by default initially populated with the root node Walsh codes of each family, i.e., $W_0^4$, $W_1^4$, $W_2^4$ and $W_3^4$.

Continuing on with the process 100, at decision step 122, it is determined if req_code is on the w_size fragment list. If the determination of step 122 is positive or yes, step 130 is then executed. Otherwise, if the determination of step 122 is negative or no, determination step 124 is executed. When req_code is a wild card, it is deemed a match for or equal to any code found on the w_size fragment list.

At decision step 124, it is determined if w_size is equal to 4, i.e., the smallest size Walsh code. If the determination of step 124 is positive or yes, then at step 126 a "NO_CODE" is returned to the requesting object or device by the allocator 20. NO_CODE indicates to the requesting object or device that no Walsh codes are available for allocation, i.e., all the Walsh codes fitting the request are either busy or blocked. That is to say, if the process 100 has tunneled down to the smallest size and no matching codes were found on any of the fragment lists, then the smallest size Walsh code is busy and consequently its progeny (i.e., all the Walsh codes in that family) are blocked. Moreover, in the case of a request for a particular Walsh code, no other family contains the Walsh code specified, this is ensured insomuch as the family containing the particular Walsh code was identified in step 118. In the case of a request for a high speed data channel were a particular family is set aside therefor, again, the process 100 is already operating within the reserved family. Similarly, in the case of a request for a non-specific Walsh code, the process is already operating in the family with the lowest count such that if a Walsh code is not available in that family, one will not be available in another family.

Provided, the determination of step 124 is negative or no (i.e., the smallest size has not yet been reached), the process 100 reduces the size being examined to the next smaller size at step 128 and then returns to decision step 122. Reducing the size being examined or reducing the size at which operations are carried out is referred to as tunneling down, while increasing the size being examined or increasing the size at which operations are carried out is referred to as tunneling up. In any event, for a non-specific or wild card req code, step 128 is implemented by merely setting w_size equal to w_size/2. When a particular code is specified in the request, however, step 128 also involves determining the parent of the particular code by setting req_code equal to req_code%w_size, after the size has been reduced by half. Accordingly, with the execution of step 128, when a particular Walsh code has been specified in the request, the process 100 tunnels down, one parent at a time, through the particular series of parental ancestors corresponding to the particular code specified in the request. In this manner, it is ensured that the path being followed or traced contains the particular Walsh code specified in the request.

Steps 122 through 128, in effect, operate to successively check the fragment lists for Walsh codes matching or suited to the received request. The iterative loop starts with the fragment list corresponding to the initial size requested and steps or tunnels down in size with each iteration. The loop is broken or terminated (by advancing to step 130) when a matching or suitable code is found on one of the fragment lists, or (by advancing to step 126) when the smallest size fragment list is reached and still no fragment is found. If no code is found on a fragment list of size equal to or less than that request, then no codes are available for allocation.

At step 130, the code on the w_size fragment list matching req_code is removed therefrom and it is marked or designated as blocked. At this point, if req_code corresponds to a wild card value, it is preferably set equal to the value of the code removed from the w_size fragment list. Note, when there are a plurality of codes on the w_size fragment list that potentially match a wild card req_code, then any one of the plurality may be selected and removed.

Next, at decision step 132, it is determined if w_size is equal to req_size. If the determination of step 132 is positive or yes, at step 134 the status of req_code is marked or designated as busy, and the Walsh code corresponding to req code is allocated or returned to the requesting object or device by the allocator 20. Following step 134, the process 100 terminates or ends at step 136, optionally, after marking or designating the progeny of req_code as blocked. Preferably, after step 136, the allocator 20 awaits the next process to be carried out, be it again process 100 or the de-allocation process 200 (described with reference to FIG. 4).

On the other hand, if the determination of step 132 is negative or no, that means, in steps 122 through 128, the process 100 tunneled down one or more sizes to find a matching or otherwise suitable code on a fragment list. Accordingly, at step 138 the process 100 tunnels back up, blocking one code and fragmenting the corresponding sibling with each step up in size. The tunneling up is iteratively carried out in the processing loop comprising steps 132, 138 and 140. The loop extends successively up in size from the lowest code size reached in the tunneling down process and continues until req_size is reached.

In a preferred embodiment, when no particular code is specified in the initial request, step 138 is carried out by first setting w_size equal to w_size*2 and then setting a variable "frag_code" equal to req_code+(w_size/2). Thereafter, at step 140, the w_size Walsh code corresponding to frag_code is placed on the w_size fragment list, and the w_size Walsh code corresponding to req_code is marked or designated as blocked.

On the other hand, when a particular code is specified in the initial request, step 138 is carried out by first setting w_size equal to w_size*2 and then determining if scode%w_size is equal to req_code. If scode%w_size is equal to req_code, then frag_code is set equal to req_code+(w_size/2) before proceeding to step 140, otherwise frag_code is set equal to req_code and req_code is set equal to req_code+(w_size/2) before proceeding to step 140. In this manner, it is ensured that, while tunneling up, the proper siblings at each successive step up in size are appropriately blocked and fragmented such that the particular code specified is in the chain of blocked siblings. That is, via the tunneling up carried out in step 138 when a particular code is specified in the initial request, the parental ancestors of the specifically requested code are blocked while their siblings are fragmented.

In both cases (i.e., specific and non-specific code requests), following step 140, the process 100 returns to decision step 132. Note, in the allocation process 100 described herein, marking or designating codes as blocked or busy is optional. By the mere operation and/or functioning of the process 100 in conjunction with the fragment lists, blocked or busy codes will not be allocated even if they are not so marked or designated. However, such markings or designations are found to be helpful in certain system tests, e.g., in auditing or tracking the performance of the allocator 20. Regardless of whether or not the markings or designations are being employed, the count for each family is maintained and/or re-determined after each allocation or de-allocation.

Figure 4:
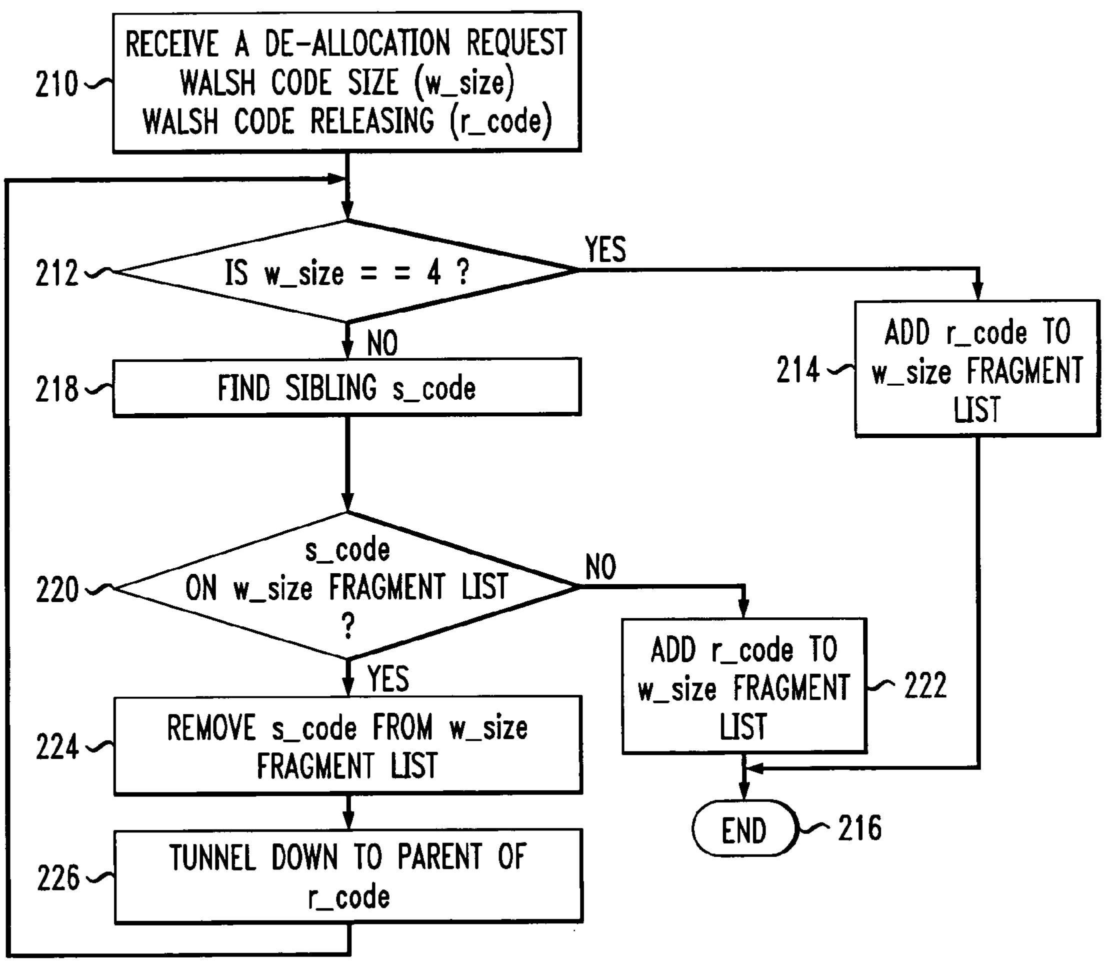
FIG. 4 is a flow chart showing a de-allocation process carried out by the Walsh code allocator in accordance with aspects of the present invention.

De-allocation allows the reuse of codes which cease being busy, i.e., those codes which were previously allocated but no longer in use currently. However, simply making a code available or reassigning it to an available status is insufficient. To ensure the continued efficient use of the Walsh codes, it is also desired that the fragment lists be appropriate updated, and optionally, any codes marked or designated as blocked should also be properly reclassified when appropriate. In accordance with a preferred embodiment of the present invention, the flow chart of FIG. 4 illustrates the de-allocation process 200 carried out by the Walsh code allocator 20, i.e., the method by which Walsh codes are de-allocated.

The process 200 begins at step 210 with the allocator 20 receiving an indication that a previously busy Walsh code is being released, i.e., a request for de-allocation. For example, the indication is generated in conjunction with and/or is precipitated by the closing of a previously open channel, be it an overhead channel, a fundamental channel of voice or data traffic, or otherwise. The received de-allocation request includes an indication of the particular Walsh code being released and its size. In the flow chart, the size is denoted by the variable "w_size" and the code is denoted by the variable "r_code". Both are initially set in accordance with the received request. The initial r_code value dictates the WCF to which the process 200 is restricted for a given de-allocation request. Accordingly, for simplicity herein, the particular WCF is not referred to further in describing the process 200.

Next, at decision step 212 it is determined if w_size is equal to 4 (i.e., the smallest Walsh code size). If the determination of step 212 is positive or yes, the code corresponding to r_code is added (at step 214) to the w_size fragment list prior to the process 200 terminating or ending at step 216. Preferably, after step 216, the allocator 20 awaits the next process to be carried out, be it again process 200 or the allocation process 100 (described with reference to FIG. 3).

On the other hand, if the determination of step 212 is negative or no, the sibling of r_code is determined and/or selected at step 218. The sibling, denoted by "s_code", is found as follows: if r_code is greater than or equal to w_size/2 then s_code is set equal to r_code-(w_size/2), otherwise s_code is set equal to r_code+(w_size/2).

It is determined, at decision step 220, if s_code is on the w_size fragment list. If the determination of step 220 is negative or no, r_code is added (at step 222) to the w_size fragment list and the process 200 advances to the ending or termination step 216. If the determination of step 220 is positive or yes, s_code is removed (at step 224) from the w_size fragment list and the process 200 advances to the step 226.

At step 226, the process 200 tunnels down to the parent of r_code. This is achieved by first setting w_size equal to w_size/2 and then setting r_code equal to r_code%w_size.

Following step 226, the process 200 loops back to decision step 212, optionally, after marking or designating the Walsh code corresponding to the current r_code of the current w_size to the temporary status of "unknown". The temporary unknown status persists until the next iteration when it will be determined if the corresponding Walsh code is to be put on a fragment list or not, at which point, it is optionally marked or designated appropriately.

The process 200 continues to loop back iteratively until either the smallest code size is reached (i.e., w_size is equal to 4), or until s_code is not on the w_size fragment list. In either case, at decision steps 212 or 220, respectively, the process 200 branches out of the loop. At that point, the process 200 has ensured that the respective fragment lists have been appropriately updated (with the exceptions of the final updates executed via steps 214 and 222, respectively) in view of the requested de-allocation received in step 210.

The invention has been described with reference to the preferred embodiments. Obviously, modifications and alterations will occur to others upon reading and understanding the preceding detailed description. For example, the present invention is applicable to and/or readily implemented in connection with a variety of network environments and/or protocols, such as, Universal Mobil Telecommunications System (UMTS) and the like. In any event, it is intended that the invention be construed as including all such modifications and alterations insofar as they come within the scope of the appended claims or the equivalents thereof.

What is claimed is:

1. A method of allocating CDMA codes from a set thereof for use in connection with a wireless network, said method comprising:

(a) identifying a desired size of a code to be allocated from a set of code families, each family being designated by a different root code of the same size that is the smallest size within the family;

(b) determining if there exists a code of the desired size whose sibling is unavailable;

(c) allocating a code of the desired size whose sibling is unavailable when the determination of step (b) is that there does exist a code of the desired size whose sibling is unavailable;

(d) determining if there exists a code of smaller than the desired size whose sibling is unavailable when the determination of step (b) is that there does not exists a code of the desired size whose sibling is unavailable;

(e) identifying a code of smaller than the desired size whose sibling is unavailable when the determination of step (d) is that there does exist a code of smaller than the desired size whose sibling is unavailable; and, (f) allocating a code of the desired size which is a descendant of the identified code when a code is identified in step (e).

2. The method according to claim 1, wherein step (d) comprises:

progressing iteratively through successively smaller sizes starting at a size just smaller than the desired size; and, determining, with each iteration, if there exists a code of the size progressed to whose sibling is unavailable.

3. The method according to claim 2, wherein the progressing continues only until a code of the progressed to size whose sibling is unavailable is found to exist.

4. The method according to claim 3, wherein the identified code of step (e) is of the progressed to size reached in step (d).

5. The method according to claim 1, further comprising:

dividing the set of codes into a plurality of families; and, selecting a particular family from the plurality thereof such that step (a) through (f) are carried out with respect to the codes in the particular family, wherein the particular family selected has a number of unavailable codes of a largest size which is no greater than any other unselected family.

6. A Walsh code allocator for use in connection with a wireless telecommunications network, said allocator comprising:

a receiving means that receives a request for a Walsh code;

determination means for choosing, based on the request received, a Walsh code family from which the allocator selects a Walsh code, said determination means choosing from a plurality of different Walsh code families which each include a plurality of Walsh codes of at least two different sizes, wherein said Walsh code families are designated by different root codes of the same size that is the smallest size within each family;

selection means for selecting, from the family chosen by the determination means, a Walsh code suited to the request received, said selection means selecting the Walsh code such that the selected Walsh code is mutually orthogonal to Walsh codes which are currently busy, and such that an allocation of the selected Walsh code results in blocking a minimum number of Walsh codes not already blocked; and, allocation means for outputting from the allocator at least one of;

the selected Walsh code when a Walsh code is selected by the selection means, and an indication that a Walsh code suited to the request received is not available for allocation.

7. The allocator of claim 6, wherein the request received by the receiving means indicates a desired Walsh code size.

8. The allocator of claim 7, wherein the selection means selects a fragmented Walsh code of the desired size when one exists, otherwise a Walsh code of the desired size is selected such that it is a descendant of a fragmented Walsh code of smaller than the desired size, said fragmented Walsh code of smaller than the desired size having a size that, compared to other fragmented Walsh codes of smaller than the desired size, is as close or closer to the desired size.

9. The allocator of claim 8, wherein if no fragmented Walsh codes of a size smaller than or equal to the desired size exist within the family chosen by the determination means, then, via the allocation means, the allocator outputs an indication that a Walsh code suited to the request received is not available for allocation.

10. The allocator of claim 6, wherein the determination means chooses the family including a particular Walsh code when the particular Walsh code is specified in the request received.

11. The allocator of claim 10, wherein when no particular Walsh code is specified in the request, the determination means chooses the family with a lowest count compared to other families.

12. The allocator of claim 6, wherein one of the plurality of Walsh code families is designated for high speed data traffic such that when a request is received for a Walsh code to be used in connection with high speed data traffic, the determination means chooses the designated family.

13. The allocator of claim 6, further comprising:
a de-allocation means that updates fragment lists when busy Walsh codes cease being busy, said fragment lists having listed thereon fragmented Walsh codes.

14. A method of allocating a set of codes used to distinguish and isolate air interface channels of a wireless telecommunications network, said method comprising:
(a) dividing a set of codes into a plurality of families such that each family includes a plurality of codes, wherein each of said codes has a size and at least two codes in each family have different sizes, said families each being designated by a different root code of the same size that is the smallest size within the set;
(b) receiving a request for a code which identifies a desired size of code;
(c) choosing a family from which a code is to be selected for allocation;
(d) identifying a fragmented code in the chosen family provided one exists;
(e) selecting a code in the chosen family based on the identified fragmented code provided a fragmented code was identified, otherwise making no selection;
(f) allocating the selected code provided a selection was made, otherwise indicating that no code is available.

15. The method of claim 14, wherein the fragmented code identified is of the desired size provided one of that size exists, otherwise the fragmented code identified has a size which is smaller than the desired size and is as close or closer to the desired size when compared to any other fragmented codes of smaller than the desired size.

16. The method of claim 15, wherein the code selected is the identified fragmented code when the identified fragmented code is of the desired size, otherwise the code is selected from the identified fragmented code's progeny such that the selected code is of the desired size.

17. The method of claim 14, wherein when the request received also indicates a specific code which is desired, the family chosen is that one which includes the specific code.

18. The method of claim 14, wherein when the request received does not indicate a specific code, the family chosen is that one which has a smallest combined number of blocked and busy codes of a largest code size.

19. The method of claim 14, wherein one of the plurality of families is designated for high speed data traffic such that when a requested is received for a code to be associated with high speed data traffic, the designated family is chosen.

20. The method of claim 14, further comprising:
(g) maintaining a list of fragmented codes; and,
(h) updating the list of fragmented codes when busy codes cease being busy.

* * * * *